United States Patent [19]
De Jesus et al.

[11] Patent Number: 5,832,206
[45] Date of Patent: *Nov. 3, 1998

[54] APPARATUS AND METHOD TO PROVIDE SECURITY FOR A KEYPAD PROCESSOR OF A TRANSACTION TERMINAL

[75] Inventors: Armando De Jesus, Virginia Beach; Eric Schertz, Hampton, both of Va.

[73] Assignee: Schlumberger Technologies, Inc., Chesapeake, Va.

[ * ] Notice: This patent issued on a continued prosecution application filed under 37 CFR 1.53(d), and is subject to the twenty year patent term provisions of 35 U.S.C. 154(a)(2).

[21] Appl. No.: 622,521

[22] Filed: Mar. 25, 1996

[51] Int. Cl.$^6$ ............................... G06F 11/00; G07F 7/10
[52] U.S. Cl. ............................................. 395/186; 341/26
[58] Field of Search ............................... 395/186, 187.01, 395/188.01; 341/22, 26, 24; 380/24, 46, 47, 42, 21, 3, 4; 361/736, 740, 743; 340/825.3; 364/479.07

[56] References Cited

U.S. PATENT DOCUMENTS

| | | | |
|---|---|---|---|
| 3,720,938 | 3/1973 | Leposavic | 340/365 S |
| 4,727,476 | 2/1988 | Rouchon | 364/200 |
| 5,168,519 | 12/1992 | Scarinci et al. | 380/6 |
| 5,197,840 | 3/1993 | Leith et al. | 340/825.3 |
| 5,233,505 | 8/1993 | Chang et al. | 361/7.85 |
| 5,254,989 | 10/1993 | Verrier et al. | 341/26 |
| 5,309,387 | 5/1994 | Mori | 365/52 |
| 5,371,797 | 12/1994 | Bocinsky, Jr. | 380/24 |

FOREIGN PATENT DOCUMENTS

| | | | |
|---|---|---|---|
| 0 248 712 | 12/1987 | European Pat. Off. | G07F 7/10 |
| 0 368 520 | 5/1990 | European Pat. Off. | H03M 11/00 |
| 0 375 546 | 6/1990 | European Pat. Off. | G06F 11/00 |
| 0 573 719 A1 | 12/1993 | European Pat. Off. | H03M 11/00 |
| 2190775 | 11/1987 | United Kingdom | G07F 7/10 |
| 2 223 115 | 3/1990 | United Kingdom | H03M 11/00 |

*Primary Examiner*—Joseph Palys
*Attorney, Agent, or Firm*—Frishauf, Holtz, Goodman, Langer & Chick, P.C.

[57] ABSTRACT

Apparatus to provide security for a keypad processor of a transaction terminal includes a secured processor coupled to a keypad and processor of the transaction terminal. The apparatus may operate in a secured or an unsecured mode. In a secured mode, the apparatus prevents the fraudulent acquisition of information, such as personal identification numbers (PIN), entered through the keypad. By encrypting data entered through the keypad, the apparatus prevents the fraudulent acquisition of information transmitted to a processor such as a central computer of a bank. The secured processor provides actual and false sampling of the keypad and simulates keypad data entries to prevent an electronic eavesdropper from determining the actual keypad entries.

34 Claims, 9 Drawing Sheets

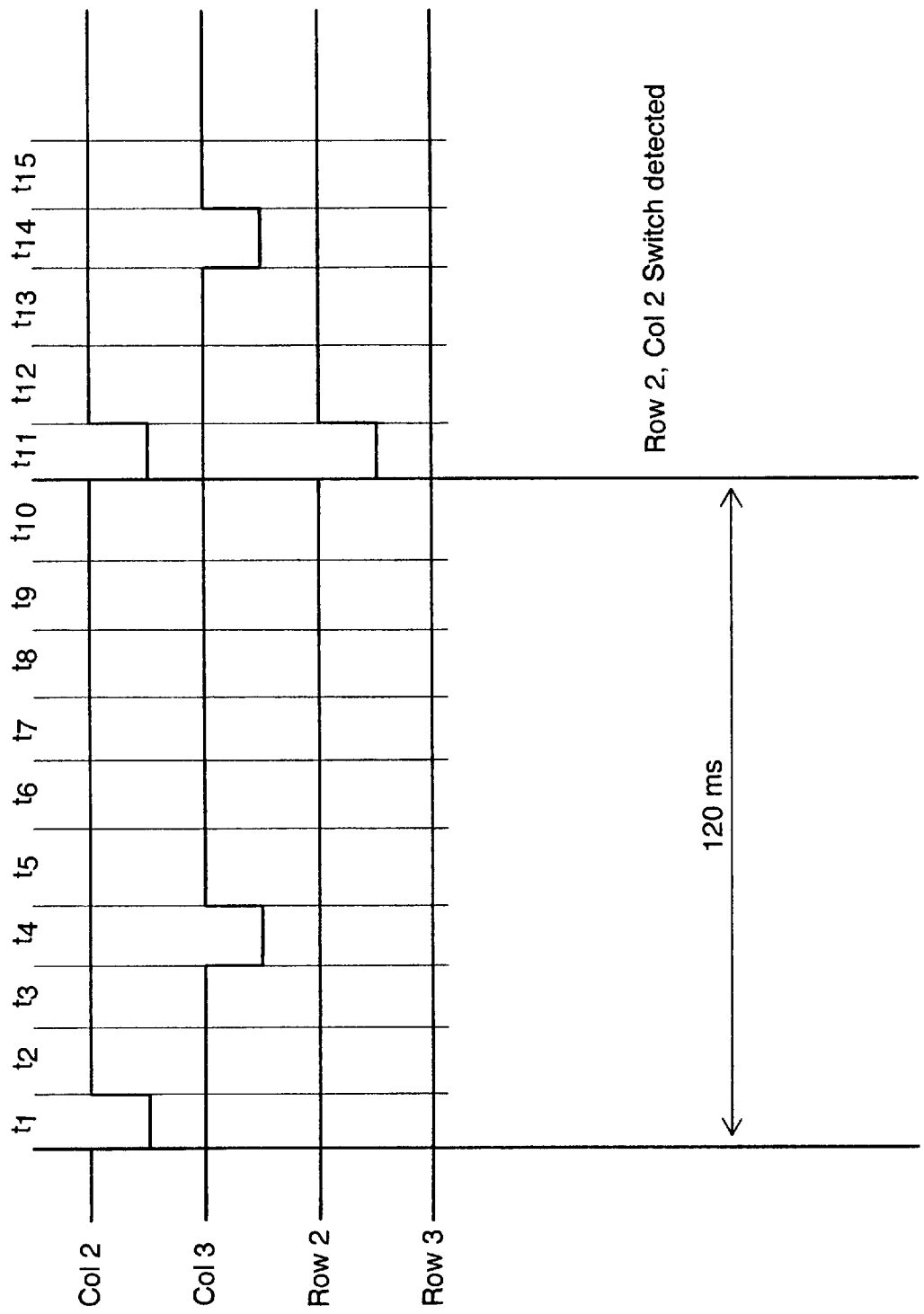

APPARATUS AND METHOD TO PROVIDE SECURITY FOR A KEYPAD PROCESSOR OF A TRANSACTION TERMINAL

BACKGROUND OF THE INVENTION

1. Field of the Invention

The present invention relates to an apparatus and method for use with a transaction terminal, and more specifically to an electronic circuit that detects data entry on the keypad of a transaction terminal and inhibits the fraudulent acquisition of the entered data.

2. Description of the Related Art

Transaction terminals such as automatic teller machines (ATMs), electronic funds transfer at point of sale (EFTPOS) terminals and retail transaction terminals (i.e., credit card and debit machines) are becoming increasingly common. Normally, a user inserts an identification card having a magnetic stripe into a card reader to identify the user and provide data such as account information. Thereafter, in order to effectuate a transaction, the user enters a personal identification number (PIN) via a keypad. The combination of the PIN and the account information authorizes the store or bank that issued the account to effectuate a charge against the account, or to transfer funds to or from the owner's account. The requirement of the PIN together with the account information ensures the owner that the acquisition of either item alone by a thief will not enable the thief to fraudulently transfer funds or charge the owner's account.

Transaction terminals have the disadvantage that it is possible for an electronic eavesdropper to attach electrical "tapping" connections to the card reader or keypad conductors in order to monitor when a card is inserted in the card reader and when a circuit connection is made by a key depression (e.g., when PIN data is entered). It is also possible for an electronic eavesdropper to monitor radiation emissions which are created when a card is inserted in the card reader and when a circuit connection is made by a key depression of the keypad (e.g., when PIN data is entered). It is therefore possible for the electronic eavesdropper to obtain account and PIN information from the transaction terminal and to use that data to execute a fraudulent transaction. The abovementioned eavesdropping methods enable execution of the fraudulent transaction by an unauthorized person without physically acquiring the bank card and without visually observing the user inputting the PIN. This type of fraudulent transaction costs banks, credit card companies, retail merchants and consumers hundreds of millions of dollars each year.

OBJECTS AND SUMMARY OF THE INVENTION

It is therefore an object of the present invention to provide an apparatus and method which substantially prevents an electronic eavesdropper from determining which keys of a transaction terminal keypad are pressed and from fraudulently obtaining account information and the personal identification number (PIN).

It is another object of the present invention to provide an apparatus and method which can monitor a transaction terminal keypad and identify actual data entries while generating false data entries to simulate the actual data entries.

It is a further object of the present invention to produce false polling signals for masking actual polling signals used to monitor data entry ports.

It is yet another object of the present invention to provide a secured processor having a reduced risk of physical tampering.

It is a further object of the present invention to provide an apparatus and method which reduces the likelihood of successful electronic eavesdropping by varying the duration of sampling signals utilized to sample a transaction terminal keypad.

It is still a further object of the present invention to provide an apparatus and method which reduces the likelihood of successful electronic eavesdropping by varying an amount of time elapsed between sampling signals utilized to sample a transaction terminal keypad.

It is yet a further object of the present invention to provide a secured processor coupled to a transaction terminal which does not expose a PIN and associated account information obtained from the transaction terminal to external data lines without encryption.

It also an object of the present invention to overcome inherent disadvantages of known keypad transaction terminal electronic circuits.

In accordance with one form of the present invention, a secured processor, which is preferably contained in a transaction terminal, includes an actual polling circuit. The actual polling circuit generates actual polling signals to monitor a plurality of data entry ports (e.g., keys of a data entry keypad) to determine whether data is being provided to the keypad of the transaction terminal. The actual polling circuit identifies the data entry ports actuated by a user.

The secured processor also includes a false polling circuit adapted to be operatively coupled to the data entry ports. The false polling circuit provides a false polling signal to the data entry ports which triggers a false response from the data entry ports for producing a false indication (i.e., simulation) to an electronic eavesdropper which simulates that data is being entered through the data entry ports. The false polling circuit also provides a false indication (i.e., masking) to an electronic eavesdropper which masks that actual polling of the data entry ports is being conducted by the actual polling circuit. In this way, an electronic eavesdropper will not be able to determine which signals are actual polling signals, which signals are false polling signals and when PIN data is actually being entered through the data entry ports.

The secured processor also includes a data encoding circuit operatively coupled to the actual polling circuit. The data encoding circuit is responsive to the actual polling circuit, encodes the data signals provided through the data entry ports, and generates encoded data which is provided to an auxiliary processor via a data line for transmission to a central processor located outside the transaction terminal.

The secured processor also includes a control circuit operatively coupled to the actual polling circuit and the false polling circuit for activating and deactivating the polling (i.e., sampling) operations performed by the actual and false polling circuits.

According to another aspect of the present invention, a method of providing a secured transmission of actual data signals from a plurality of data entry ports to a processor includes polling (i.e., sampling) the data entry ports to determine whether actual data signals have been provided thereto. The method also includes polling the data entry ports to trigger a false response from the data entry ports which provides a false indication to simulate that actual data signals have been provided thereto. Also a false indication is provided that polling of the data entry ports is occurring in order to mask the actual polling. The method further includes encoding the actual data signals and transmitting the encoded data signals to a central processor located outside the transaction terminal.

A preferred form of the apparatus and method to provide security for a keypad processor of a transaction terminal, as well as other embodiments, objects, features and advantages of this invention, will be apparent from the following detailed description of illustrative embodiments thereof, which is to be read in connection with the accompanying drawings.

BRIEF DESCRIPTION OF THE DRAWINGS

FIG. 3A is a timing chart showing the generation of actual polling signals by the secured processor in accordance with the present invention.

DETAILED DESCRIPTION OF THE PREFERRED EMBODIMENTS

Figure 1:
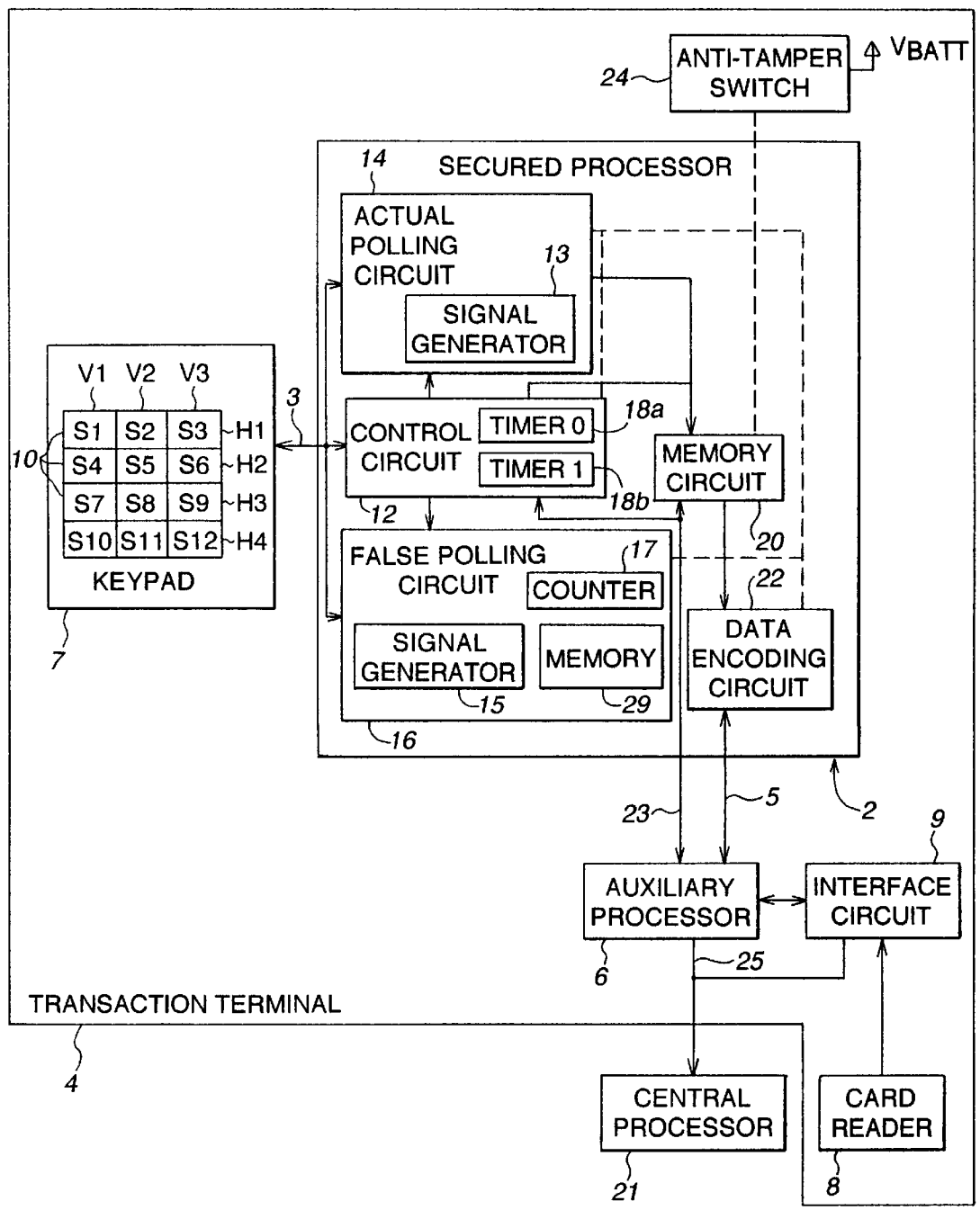
FIG. 1 is a block diagram of the secured processor coupled to a keypad, an auxiliary processor, interface circuit and card reader in accordance with the present invention.

Referring to FIGS. 1–4 of the drawings, a preferred form of the secured processor 2 constructed in accordance with the present invention will now be described. The secured processor 2 is preferably contained within a transaction terminal 4. The secured processor is preferably coupled to a keypad 7 via transmission line 3, and to an auxiliary processor 6 via data lines 5, 23. The keypad 7 is utilized for data entry by and communication with a user (e.g., via an electronic ATM touch screen). The secured processor 2 is also operatively coupled to a card reader 8 via the auxiliary processor 6, interface circuits 9 and data line 5 as shown in FIG. 1. Card reader 8 is adapted to accommodate insertion of a bank card, credit card or other suitable identification card. Interface circuit 9, as is known in the art, serves as the principal input/output interface between the card reader 8, auxiliary processor 6, central processor 21, and secured processor 2. Preferably, interface circuit 9 is an application specific integrated circuit (ASIC) particularly designed to interface with the aforementioned circuits.

The keypad 7 preferably includes a conventional keypad array having a plurality of keys. Each key preferably has a keyswitch 10 associated therewith. As is known in the art, the keyswitch provides an electrical connection between a specific row conductor and column conductor when a corresponding key is depressed. The keyswitches 10 of the keypad array are denoted in FIG. 1 as S1–S12. Although twelve keyswitches arranged in three columns and four rows are shown, it is foreseen that alternate configurations of the keyswitches may be utilized.

As is known in the art, a keypad includes a plurality of horizontal conductors (H), each being associated with a specific row of keys, and a plurality of vertical conductors (V), each being associated with a specific column of keys. Whenever a particular key of the keypad is actuated, the corresponding keyswitch serves to electrically couple a row conductor (H) associated with the row in which the selected key is situated, with a column conductor (V) associated with the column in which the selected key is situated. As shown in FIG. 1, the vertical conductors associated with the three columns are designated V1, V2 and V3 respectively. The horizontal conductors associated with the four rows are designated H1, H2, H3 and H4 respectively.

In order to determine which key of the keypad has been depressed, the secured processor 2 preferably includes a control circuit 12 and an actual polling circuit 14. Secured processor 2 also includes a false polling circuit 16. The control circuit 12 is electrically coupled to both the actual polling circuit 14 and false polling circuit 16. Actual polling circuit 14 samples (hereinafter, sampling and polling will be used interchangeably) the keypad conductors to identify an actual key depression, and false polling circuit 16 performs false sampling (i.e., masking) and simulated data entry (i.e., simulation) of the keypad, as will be described in detail below. The control circuit 12 monitors and regulates the keypad sampling performed by both actual polling circuit 14 and false polling circuit 16.

The control circuit 12 preferably includes timers 18a (TIMER 0) and 18b (TIMER 1). Timers 18a, 18b regulate the activation and deactivation of the sampling operations performed by the actual and false polling circuits, respectively. Timers 18a and 18b preferably operate at substantially different frequencies. In the preferred embodiment and as will be described in more detail below, timer 18b operates at a substantially higher frequency than timer 18a so that a substantially greater number of false samples and false data entries are generated by the false polling circuit 16 than actual sampling signals generated by the actual polling circuit 14. The timers preferably operate concurrently and independently of each other. By having the false polling circuit 16 operate concurrently with and generating substantially more samples than the actual polling circuit 14, the sampling signals generated by the actual polling circuit and the actual PIN data entries provided by a user through the keypad are masked and not readily discernable to an electronic eavesdropper. As will be described in more detail, the control circuit 12 monitors overflows (i.e., interrupts) generated by the timers and instructs the actual or false sampling circuit to perform its respective sampling operations when a timer overflow is detected.

The actual polling circuit 14 employs an actual sampling operation (described below) which samples the columns and monitors the rows of the keypad to ascertain the identity of a specific key depressed by the user. In contrast, the false polling circuit 16 employs an alternate (false) sampling operation (described below) which both creates false samplings of the keypad (to simulate the actual sampling operation) and a random simulation of key depressions so as to confuse an electronic eavesdropper (to simulate the actual key depressions).

The false sampling conducted by the false polling circuit 16 is designed to be indistinguishable, to an electronic eavesdropper, from the actual sampling conducted by the actual polling circuit 14. In order to effectuate the sampling operations, the actual polling circuit 14 and the false polling circuit 16 include respective signal generators 13, 15. The signal generators 13, 15 respectively generate actual and false sampling signals of varying width (i.e., duration) and at varying time intervals (described below) so that an electronic eavesdropper will be unable to detect a sampling pattern based on a signal width or time of transmission. The false polling circuit 16 also preferably includes counter 17 and memory means 29 for effectuating simulation of data entries (described below).

In order to vary the duration that the sampling signal is applied (i.e., the duration of the pulse), the signal generators 13, 15 apply the sampling signal to a selected conductor for a time period dictated by a random number (S in Step 63; T in Step 100; U in Step 102) selected by a random number generator (not shown) coupled to the signal generator (described below). The larger the random number, the longer the signal is applied to the selected conductor. The varying time intervals between the sampling signals (i.e., time that each sampling signal is generated) that are provided by the signal generators 13, 15 to the conductors is also dictated by a random number (Y and Z in Steps 54–60 below) selected by a random number generator (not shown) and a timer (TIMER 0 and TIMER 1) coupled to the signal generator (described below).

As will be described in more detail, actual and false polling circuits 14, 16 concurrently operate and alternately sample the conductors of the keypad. However, because timer 18b is operating at a substantially higher frequency than timer 18a, a substantially greater number of false samples are generated than actual samples. For example, the actual polling circuit may sample the keypad once. Then, the false polling circuit will sample the keypad for ten (10) consecutive times, whereupon sampling is performed by the actual polling circuit once, then the false polling circuit will sample the keypad for seven (7) consecutive times. This random actual and false sampling scheme will be described in more detail below.

In a preferred embodiment of the invention, the secured processor 2 also preferably includes a memory circuit 20 electrically coupled to the actual polling circuit 14. The memory circuit 20 receives and stores the identification of each key actuated by a user (i.e., PIN data) that is provided by the actual polling circuit 14. The memory circuit 20 preferably stores the PIN data until the processor 6 determines that all of the PIN data has been entered and identified.

The secured processor 2 also includes a data encoding circuit 22 operatively coupled to the memory circuit 20. The data encoding circuit 22 preferably receives the PIN data from the memory circuit 20, encrypts the data and sends the encrypted data via data line 5 to auxiliary processor 6 for processing and eventual transmission via data line 25 to a central processor 21.

In an alternative form of the invention, the memory circuit 20 may also receive and store account information provided by the card reader 8 and processor 6 via data lines 5. The memory circuit stores the account information with the PIN data until it is determined that all of the PIN data is received.

Thereafter, the PIN data together with the account information is encrypted and sent via data line 5 to auxiliary processor 6 wherein the encrypted data is sent to central processor 21. It is advantageous to encrypt the account information before transmission from the secured processor 2 to the central processor 21 so that a potential electronic eavesdropper will not be able to identify any information included in the transmission.

In the preferred embodiment of the invention, the secured processor 2, which includes at least the control circuit 12, actual polling circuit 14, false polling circuit 16, memory circuit 20 and data encoding circuit 22, is a microprocessor. A suitable microprocessor which may be used is Part No. 87C51RA manufactured by the Intel Corporation, or Part No. 87C524 manufactured by the Phillips Corporation. Each microprocessor contains at least 8K bytes of ROM and 512 bytes of internal RAM. Other microprocessors may be suitable, but the aforementioned microprocessors are preferred because of their relatively low cost.

The auxiliary processor 6 may be any general system controller as known in the art. Preferably, auxiliary processor 6 is a CMOS microprocessor having a 16-bit internal architecture, 8 bit external data bus and 20 address lines. The CMOS microprocessor is capable of operating at 16 MHz, but preferably operates at 9MHz. The instruction set of the auxiliary processor 6 is a superset of the 8086/8088 processors. Other suitable processors may be utilized.

Having described the circuit configuration of the secured processor 2, the operation of the apparatus will now be described. Each step of the method of operation of the secured processor is controlled by a master clock (not shown) unless otherwise specified.

Figure 2A:
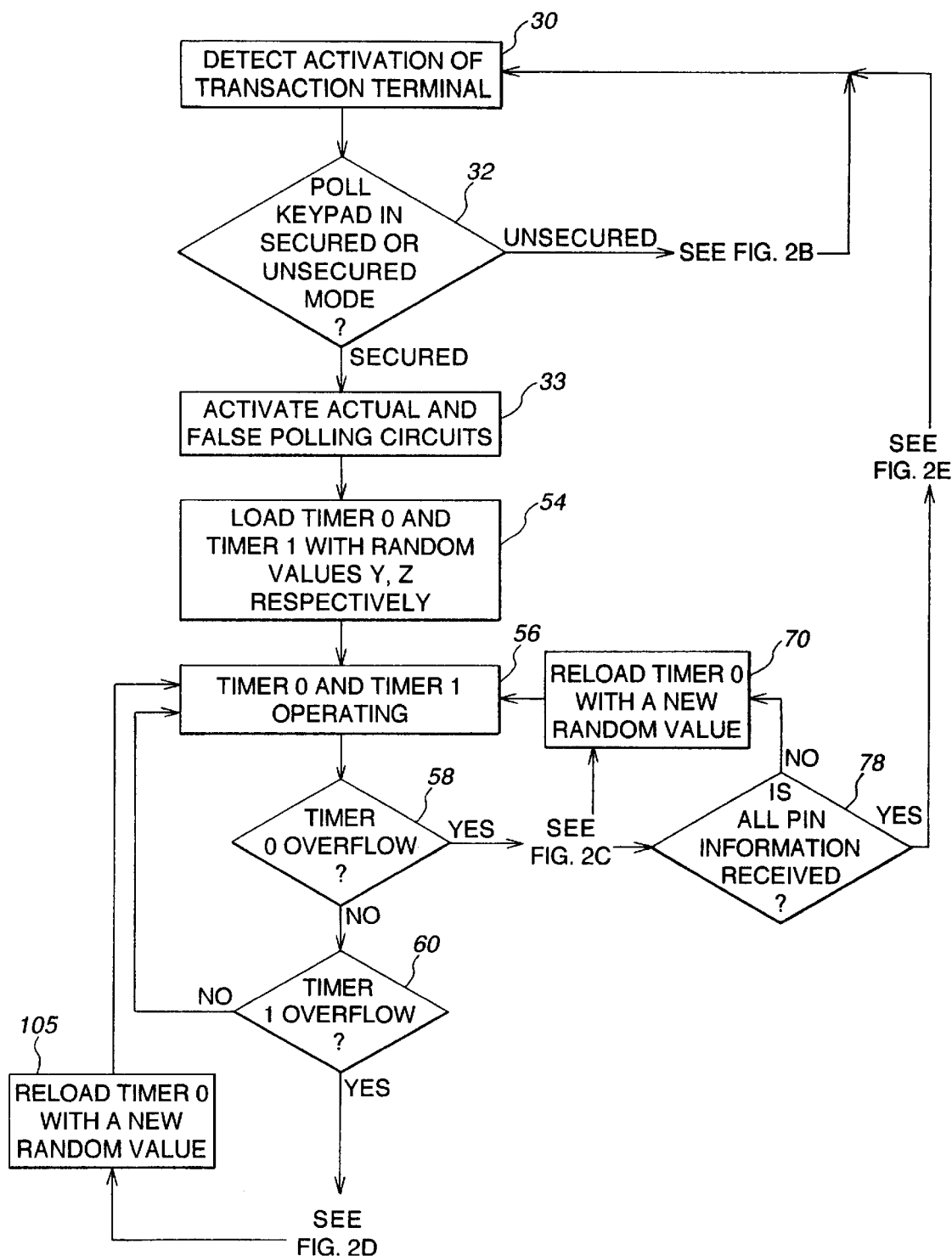
FIG. 2A is a flow chart of steps performed to provide security for a keypad processor of a transaction terminal in accordance with the present invention.

Referring now to FIG. 2A, a flow chart of the steps performed to provide security for transmission of data from a keypad of a transaction terminal to a central processor 21 is shown. In a preferred embodiment of the invention and as known in the art, the transaction terminal 4 is activated by the insertion of a bank card, charge card, identification card or the like into the card reader 8 (FIG. 1). The activation of the transaction terminal is detected (Step 30) by the auxiliary processor 6 which receives an indication of insertion of the card from the card reader 8 via interface circuit 9. (FIG. 1).

Figure 2B:
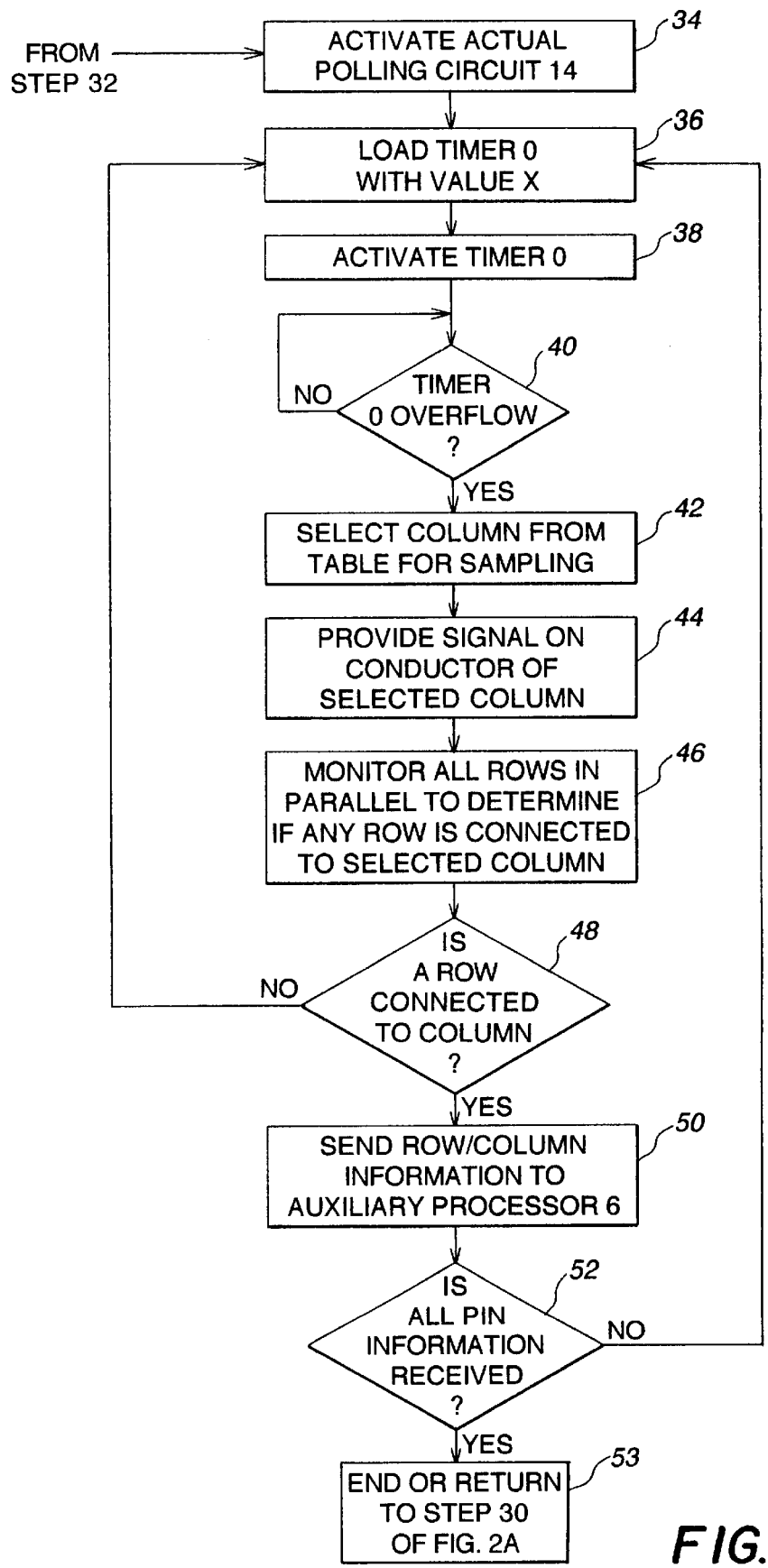
FIG. 2B is a flow chart of steps performed in the unsecured mode of obtaining PIN data from a keypad of a transaction terminal in accordance with the present invention.
Figure 2C:
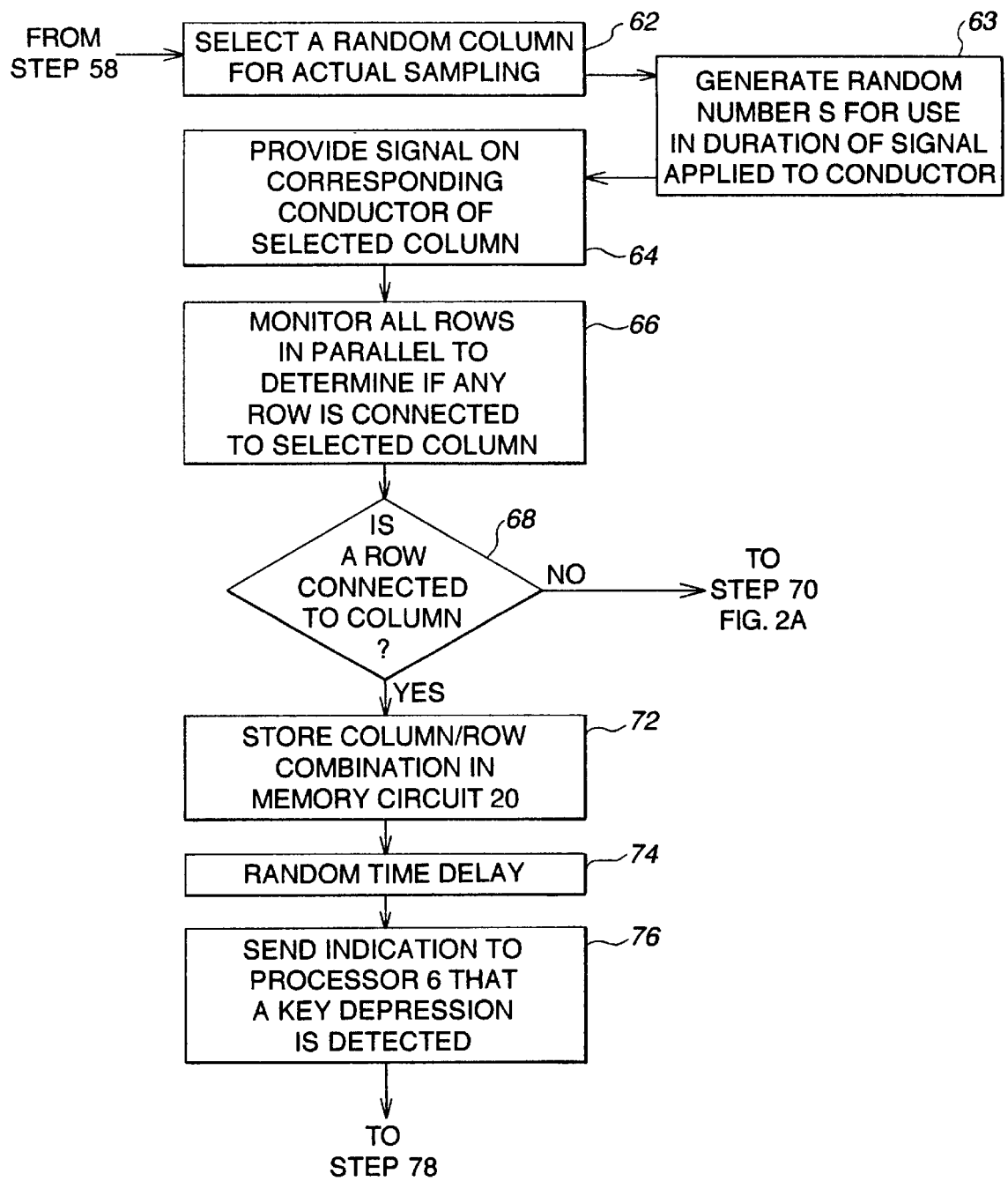
FIG. 2C is a flow chart of steps performed for providing actual polling of a transaction terminal in a secured mode in accordance with the present invention.
Figure 2D:
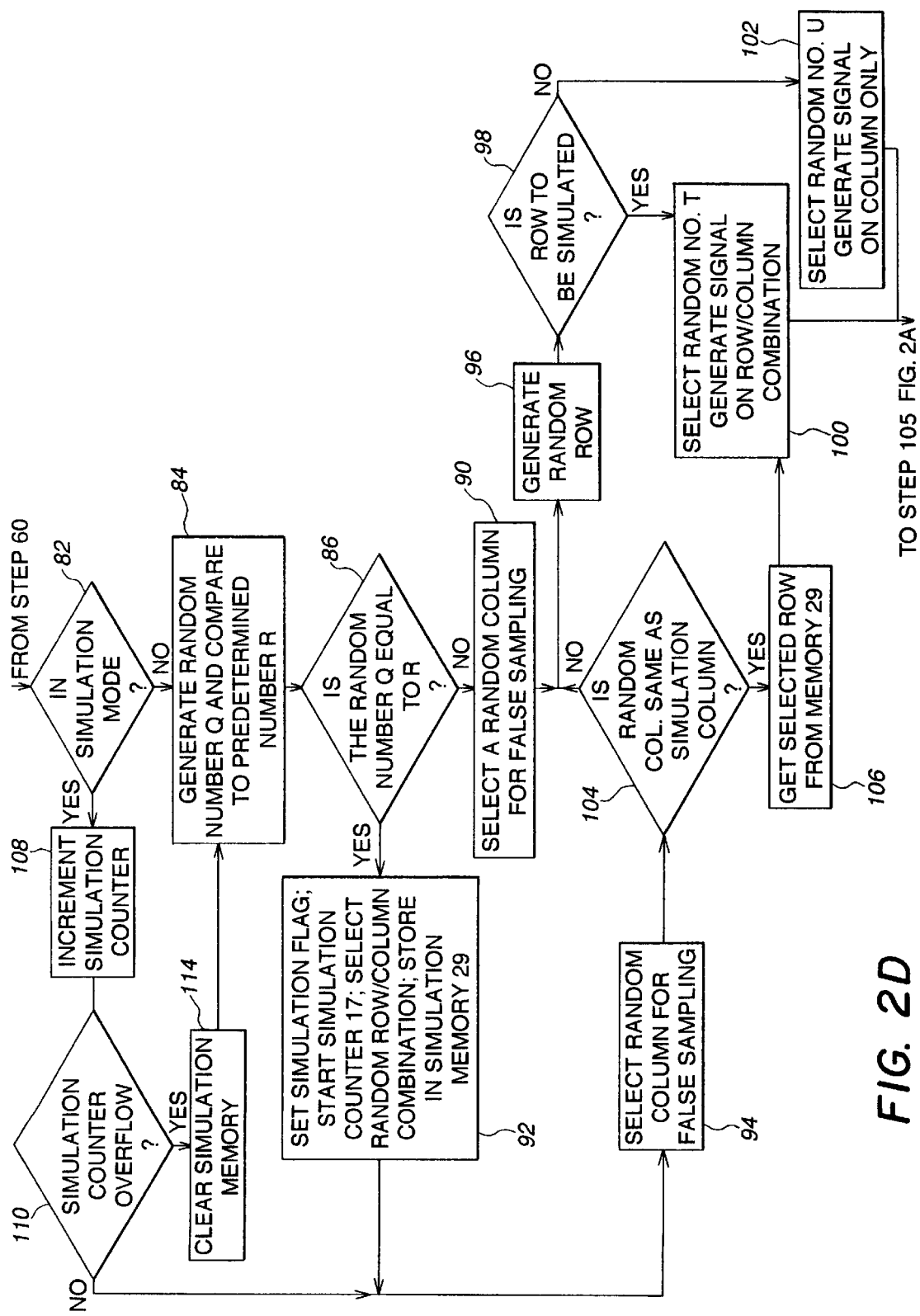
FIG. 2D is a flow chart of steps performed for providing false polling and simulated data entry of a transaction terminal in a secured mode in accordance with the present invention.

Upon detection of the activation of the transaction terminal 4 (Step 30), the auxiliary processor 6 determines whether the secured processor 2 will poll (i.e., sample) the keypad in a secured or unsecured mode (Step 32). This determination is based upon the type of transaction to take place. Unsecured polling usually is selected when there is no threat of an electronic eavesdropper acquiring the PIN data or when secret information is not to be entered through the keypad. For example, if the user is only to receive information, such as stock quotations or current interest rates, there may be no need to enter a secured mode. However, if a withdrawal, transfer of funds or other charge against an account is to take place wherein a PIN is to be entered, then a secured mode may be preferred. Secured polling is typically selected when there is a risk of unauthorized electronic monitoring of the keypad or when secret information is to be entered. If the auxiliary processor 6 determines that unsecured polling will take place, the method continues as shown in FIG. 2B. However, if secured polling is to occur, the method continues as shown in FIGS. 2A, 2C and 2D.

Referring now to FIGS. 2A and 2B, if unsecured polling is to occur (UNSECURED in STEP 32), the auxiliary processor 6 instructs the control circuit 12 to activate the actual polling circuit 14 (Step 34). The actual polling circuit 14 then begins sampling. Specifically, the TIMER 0 (18a) is loaded with an initial predetermined fixed value X (Step 36). The value X is used by the timer to determine how frequently the actual polling circuit will sample the keypad. In one embodiment of the invention, X is chosen such that the keypad is sampled by the actual polling circuit every 10 msec.

TIMER 0 is activated (Step 38) by control circuit 12 and increments its internal value. TIMER 0 is monitored to determine whether its incremented internal value is greater than the predetermined fixed value X, i.e., whether TIMER 0 has an overflow (Step 40). If the answer is NO to Step 40, TIMER 0 continues to operate until the incremented internal value of TIMER 0 is greater than X.

When TIMER 0 has an overflow (YES in Step 40), a column of the keypad is selected for sampling (Step 42). In the unsecured mode, columns are preferably sequentially selected (e.g., from a table) so that each column is substantially sampled an equal number of times. For example, column 1 (i.e., conductor V1) will be selected during the first sampling, column 2 (i.e., conductor V2) will be selected during the second sampling and so forth. Once all of the columns have been sampled, the order of selection is repeated. While in the preferred embodiment columns are selected for sampling, it is foreseen that rows may be sampled (i.e., polled) instead of columns.

Once a column has been selected, the actual polling circuit 14 utilizes the signal generator 13 contained therein to generate a signal (i.e., a pulse) which is transmitted along the selected vertical conductor (Step 44). While in the preferred embodiment pulse signals are transmitted for sampling, the use of other types of sampling waveforms is foreseen.

Contemporaneous to transmitting the signal along the vertical conductor (for example V2) corresponding to the selected column, the actual polling circuit 14 simultaneously monitors the horizontal conductors (H1, H2, H3 and H4) associated with all of the rows (Step 46). Specifically, the actual polling circuit 14 monitors all of the horizontal conductors in parallel to determine the presence of an electrical signal coincident with the signal transmitted on the selected vertical conductor. If any of the horizontal conductors has a signal transmitted thereon which is coincident with the signal transmitted on the selected vertical conductor, then that particular conductor is identified (for example H2). The key defined by the row and column corresponding to conductors H2 and V2, respectively, is noted as having been selected by the user (Step 48). If none of the horizontal conductors are determined as being coupled to the selected vertical conductor, (NO in Step 48), then TIMER 0 is reloaded with the predetermined fixed sampling value X (Step 36) and the timer is once again activated (Step 38).

If it is determined that a row is connected to the sampled column (YES in Step 48), then the selected column and detected row are noted and the row and column combination information is provided directly to auxiliary processor 6 (Step 50) via data line 23. Alternatively, the PIN data is stored in memory circuit 20 before being provided to auxiliary processor 6. The auxiliary processor 6 then determines whether all of the PIN data has been received (Step 52). If all of the PIN information has been received and/or detected (YES in Step 52), operation of the actual polling circuit 14 is temporarily suspended by the control circuit 12 until it is once again activated by insertion of an identification card in the card reader 8 (Step 53). If the processor 6 determines that all of the PIN data has not been received and/or detected (NO in Step 52), TIMER 0 is reloaded with the predetermined fixed sampling value X (Step 36) and TIMER 0 is once again activated (Step 38). Thereafter, the sampling process shown in FIG. 2B is repeated until the processor 6 determines that all PIN data has been received (YES in Step 52).

Referring again to FIG. 2A, if the secured processor 2 is to operate in a secured mode because secret information (e.g., PIN data) is to be entered or if there is a threat of electronic eavesdropping (SECURED in Step 32), the actual polling circuit 14 and the false polling circuit 16 are activated (Step 33), and TIMER 0 and TIMER 1 are loaded with randomly generated values Y, Z respectively (Step 54). Thereafter, TIMER 0 and TIMER 1 are activated and operating (Step 56). Preferably, random value Y is substantially larger than random value Z so that the TIMER 1 will overflow more often than TIMER 0. Therefore, even if TIMER 0 and TIMER 1 are operating at the same frequency, the false polling circuit 16 will sample the keypad substantially more times than the actual polling circuit 14.

The secured processor 2 monitors TIMER 0 and TIMER 1 to determine when a timer has an overflow. Initially, TIMER 0 is checked to determine whether there has been an overflow, i.e., whether the value of TIMER 0 is greater than random value Y (Step 58). If TIMER 0 does not have an overflow (NO in Step 58), then TIMER 1 is checked to determine if there has been an overflow, i.e., whether the value of TIMER 1 is greater than random value Z (Step 60). If there has not been an overflow of TIMER 1 (NO to Step 60), the method returns to Step 56 wherein TIMER 0 and TIMER 1 are operating. This loop is continued until either TIMER 0 or TIMER 1 has an overflow. In one embodiment of the invention, TIMER 0 overflows (i.e., a new random column is selected for sampling by the actual polling circuit) every 8–12 msec and TIMER 1 overflows (i.e., a new random column is selected for sampling by the false polling circuit) every 0.5–1.5 msec. However, it is foreseen that other sampling rates may be employed.

If TIMER 0 has an overflow (YES in Step 58), then the method continues as shown in FIG. 2C. However, if TIMER 1 is determined as having an overflow (YES in Step 60), then the method continues as shown in FIG. 2D.

Referring now to FIG. 2C, if an overflow of TIMER 0 is determined (YES is Step 58), the actual polling circuit 14 selects a random column for actual sampling (Step 62). Specifically, using a random number generation method such as that disclosed on page 199 of the book entitled "Digital Computing and Numerical Methods", by Brice Carnaham and James O. Wilkes, published by John Wiley and Sons, Inc. (1973), which is incorporated herein by reference, the actual polling circuit 14 selects a random column (i.e., vertical conductor V) for sampling. While a random number generation method is disclosed in the above reference, other methods of selecting a random column for sampling may be employed.

While in the preferred embodiment the column is randomly selected, it is foreseen that columns may be sampled sequentially (as explained above in connection with unsecured sampling) and that rows may be sampled (i.e., polled) instead of columns. However, when potential eavesdropping is a concern, it is preferable to use a random selection of columns (or rows) to insure that an electronic eavesdropper will be unable to differentiate the actual sampling from false sampling as will be explained below.

Referring still to FIG. 2C, the actual polling circuit 14 selects one of the first, second and third columns respectively designated by vertical conductors V1, V2 and V3 (FIG. 1) for sampling. Thereafter, a random number S is generated. The random number determines the duration of the sampling signal. The actual polling circuit 14 utilizing the signal generator 13 contained therein, then generates a signal which is transmitted along the selected vertical conductor (Step 64) for the duration (i.e., clock cycles) indicated by the random number selected in Step 63. Referring to FIG. 3A, if Column 2 (designated by vertical conductor V2) is selected as the random column during time frame $t_1$, the pulsed signal will be transmitted by the signal generator of actual polling circuit 14 along conductor V2. While in the preferred embodiment pulsed signals are transmitted for sampling, the use of other types of waveforms is foreseen. In yet another embodiment of the invention, the pulsed signals generated by the signal generator and transmitted by the actual polling circuit during each sampling cycle randomly vary in width (i.e., duration) as will be explained in more detail below, so that an electronic eavesdropper will be unable to detect a sampling pattern.

Contemporaneous to transmitting the pulsed signal along conductor V2, the actual polling circuit 14 monitors the horizontal conductors (H1, H2, H3 and H4) associated with all of the rows (Step 66). Specifically, the actual polling circuit 14 monitors all of the horizontal conductors in parallel, to determine the presence of an electrical signal. If none of the horizontal conductors has an electrical signal (i.e., no row is electrically coupled to the selected column), then a key of the keypad has not been depressed (NO in Step 68). Therefore, TIMER 0 is reloaded with a new random value Y (Step 70). The TIMER 0 is once again operating (Step 56), and is monitored for another overflow (Step 58). If a horizontal conductor (H) is detected as having a signal which is coincident with the signal transmitted on the selected vertical conductor (V) (YES in Step 68), then the key defined by the detected row and selected column is noted as having been activated by the user. The row/column combination is then stored in memory circuit 20 (Step 72). For example and referring to FIG. 3A wherein time periods $t_1$–$t_{15}$ are shown, if horizontal conductor H2 is detected as having the pulsed signal transmitted thereon, then row 2 is determined as being connected with column 2. This is shown during the time period $t_{11}$. As shown in FIG. 1, the determination of the connection of row 2 and column 2 is indicative of the actuation of keyswitch S5 of the keypad.

Figure 2E:
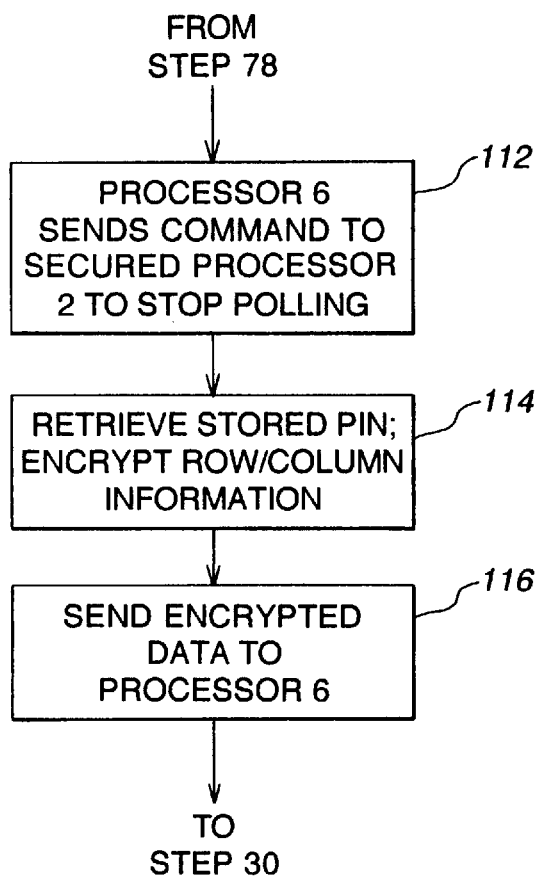
FIG. 2E is a flow chart of steps performed for encrypting data and providing the encrypted data from the secured processor to a processor in a secured mode in accordance with the present invention.

The keyswitch information (i.e., row and column combination) is preferably provided by the actual polling circuit 14 to the memory circuit 20 (Step 72) and is temporarily stored in the memory circuit 20 (FIG. 1). Thereafter, an internal timer (not shown in FIG. 1) or other means is activated to create a random time (Step 74) delay in the further operation of the actual polling circuit 14 and the execution of the method of FIG. 2C. Then, a signal is provided to the secured processor 6 via data line 5 (Step 76). The signal is designed to provide an indication to the processor 6 that a key has been actuated (i.e., that a row/column combination has been detected). Contrary to Step 50 in connection with unsecured polling shown in FIG. 2B, Step 76 does not send the actual row/column information to auxiliary processor 6. Instead, a signal is sent to inform auxiliary processor 6 that an actual row/column combination corresponding to key depression has been identified. Based upon the number of such signals received, the auxiliary processor 6 determines whether all of the PIN data has been received through the keypad (Step 78). If all of the PIN data has not been received (NO in Step 78), then the TIMER 0 is reloaded with a new random value Y (Step 70), the TIMER 0 operates (Step 56), and is monitored for the next overflow (Step 58). However, if the processor determines that all of the PIN data has been received (YES in Step 78), the method continues as shown in FIG. 2E which will be described.

Referring to FIGS. 2A and 2D, if TIMER 1 (corresponding to the false polling circuit 16) is determined as not having an overflow (NO in Step 60), the method returns to Step 56 wherein TIMER 0 and TIMER 1 continue to operate. However, if TIMER 1 is detected as having an overflow (YES in Step 60), a determination is made as to whether the false polling method is currently in a simulation mode (Step 82). Specifically, the secured processor determines whether a flag has been set (per Step 92, as discussed below) indicating that the simulation mode has been entered. The simulation mode is designed to provide a false indication that a data entry has been made on the keypad (i.e., simulating a key depression) to confuse an electronic eavesdropper. Specifically, coincident signals are sent to both a row conductor (H) and column conductor (V) of the keypad.

If the false polling circuit 16 is not currently in simulation mode, i.e., the simulation flag has not been set (NO in Step 82), then false sampling of the keypad takes place wherein a random number Q is generated using a random number generation method as previously described. The false sampling is designed to mask the actual sampling signals generated by the actual polling circuit. The random number Q is compared to a predetermined number R (Step 84). If the random number Q is not equivalent to the predetermined number R (NO in Step 86), then the simulation mode is not initiated, i.e., the simulation flag is not set. Therefore, a random column is selected for false sampling (Step 90) as described above in connection with Step 62 of the actual polling circuit. However, if the randomly generated number Q is equal to the predetermined number R (YES in Step 86), a simulation flag is set, a simulation counter 17 (see FIG. 1) is activated, and a random column and row combination are selected and stored in memory 29 (Step 92). The selected row and column combination will be used in the simulation mode such that if a random column selected in Step 94 coincides with the column of the row/column combination selected in Step 92, then a random row will not be selected and the row chosen in Step 92 will be used for simulation, as will be described in more detail below.

After the method determines that the simulation mode is not to be commenced (NO in Step 86), a random column is selected (Step 90) using a random selection process. Thereafter, a random row is selected (Step 96) using a random selection process substantially similar to the selection of the random column. Then, a random determination is made (as explained below) as to whether the randomly selected row is to have a signal provided thereon to confuse an electronic eavesdropper (Step 98). If the randomly selected row is to be used, (YES in Step 98), a random number T is selected and signals are provided by signal generator 15 of the false polling circuit 16 on both the randomly selected column and row (Step 100) for the duration indicated by random number T. However, if the randomly selected row is not to have a signal transmitted thereon, then a random number U is selected and a signal is only provided on the conductor of the randomly selected column (Step 102) for the duration indicated by random number U.

The determination made by Step 98 of whether the randomly selected row is to be falsely connected to the selected column may be accomplished by any known method wherein two alternative outcomes are possible. One suitable method utilizes a random number generator wherein one outcome (i.e., the row is to be falsely connected) is associated with the generation of an odd random number and a second outcome (i.e., the row is not be falsely connected) is associated with the generation of an even random number. Other suitable methods may be employed. A random decision process is used so that an electronic eavesdropper will be unable to detect a decision-making pattern with respect to Step 98.

The following explanation returns to Step 86 when its determination results in a YES output. After the simulation counter is started and a random row/column combination has been selected and stored in Step 92, and a random column is selected in Step 94, a determination is made (Step 104) as to whether the randomly selected column (from Step 94) is the same as the column of the row/column combination selected in Step 92 and stored in memory 29. If the column selected in Step 94 is not the same as the column of the row/column combination selected in Step 92 (NO in Step 104), then a random row is selected (Step 96). Thereafter, the aforementioned random determination is made as to whether the randomly generated row will have a signal provided thereon (Step 98). If the row is not to have a signal provided thereon (NO in Step 98), then only a signal is provided on the selected column conductor to perform false sampling (Step 102). However, as previously mentioned, if the randomly generated row is to include a signal thereon (YES in Step 98), then the column selected in Step 94 and the row selected in Step 96 each have a signal provided thereon. The signals may or may not be coincident, and may vary in duration, start time and/or end time (Step 100). By providing the pulsed signal on the conductors of both the randomly selected column and row, it will mask the actual sampling signals and, if coincident, simulate actual key entries being made. This will confuse an electronic eavesdropper because random signals (i.e., noise) are being transmitted on the row conductors.

If it is determined that the method is currently in a simulation mode to simulate actuation of a keypad (YES in Step 82), and that the randomly selected column from Step 94 coincides with the column selected in Step 92 (YES in Step 104), the row which was selected in Step 92 is obtained from memory 29 (Step 106) and the conductors corresponding to the row/column combination selected in Step 92 are provided with coincident pulsed signals to simulate a keypad entry. From detection of the pulsed signal on the conductors of both the column and row combination selected in Step 92 each time the column selected in Step 94 coincides with the column selected in Step 92 during the simulation mode, it will appear to an electronic eavesdropper that actual sampling and data entry (i.e., actuation of a key of the keypad) is occurring. After signals are transmitted on the row and column conductors (Step 100) or only on the column conductor (Step 102), TIMER 1 is reloaded with a new randomly selected value Z (Step 105) and the method returns to Step 56 wherein TIMER 0 and TIMER 1 are operating (FIG. 2A).

If after TIMER 1 is detected as having an overflow (YES in Step 60) it is determined (i.e., a simulation flag has previously been set in Step 92) that the method is currently in simulation mode (YES in Step 82), the special simulation counter 17 which was activated in step 92 is incremented (Step 108). Then, the simulation counter 17 is monitored to determine whether an overflow has occurred (Step 110). If an overflow of simulation counter 17, which is indicative of the end of the simulation mode, is detected (YES in Step 110), memory 29 which stores the column/row combination selected in Step 92 is cleared (Step 114) and the method continues with Step 84 wherein a random number Q is generated and compared to the predetermined value R to determine whether the simulation mode should be entered (i.e., restarted). Preferably, both the predetermined number R and the randomly generated number Q of Step 84 are four bit numbers such that there is a 1 in 128 probability that the simulation mode will be entered during each pass of Step 84. Preferably, the simulation counter is set to overflow after 128 cycles. However, other probabilities of entering the simulation mode and other simulation counter overflows are foreseen.

If it is determined there has not been an overflow of the simulation counter 17 (NO in Step 110), the method continues with the selection of the random column in Step 94 and the determination as to whether the random column selected in Step 94 is the same as the column selected in Step 92 as previously described.

Referring now to FIGS. 2A, 2C and 2E, once the auxiliary processor 6 determines that all of the PIN data has been identified and received (YES in Step 78), the auxiliary processor 6 sends a command to the control circuit 12 of the secured processor 2 to cease operation and polling of the keypad (Step 112). This effectively suspends operation of the actual and false polling circuits. Thereafter, the auxiliary processor 6 sends a command signal via data line 23 to the control circuit 12 to transfer the PIN data from memory circuit 20 to the data encoding circuit 22. The command signal also instructs the control circuit to command the data encoding circuit 22 to encrypt the PIN data (Step 114). After the PIN data has been encrypted, the data encoding circuit 22 sends the encrypted data to the auxiliary processor 6 (Step 116). Since the data is encrypted before it is provided on data bus 5 and to central processor 21, the PIN data is not easily discernable to eavesdroppers who may be monitoring those data lines.

After transmission of the PIN data to the central processor 21, the auxiliary processor 6 may instruct the secured processor 2 to either go into the normal unsecured mode of keypad sampling (See FIG. 2B) or to stop sampling the keypad altogether and wait for and detect the next activation of the transaction terminal by a user (e.g., insertion of an identification card into the card reader, Step 30).

The data encoding circuit 22 preferably encrypts the PIN data in accordance with an encryption technique specified by the American National Standards Institute of New York as known in the art. Other encoding and encryption methods may be utilized without departing from the scope of the invention. The present invention is designed such that once the PIN data is identified and acquired by the secured processor 2, it is encrypted within the secured processor itself. In this way, unencrypted PIN data is not exposed to external data lines (i.e., data bus 5 and 25 in FIG. 1) which would be susceptible to electronic eavesdropping.

Figure 3B:
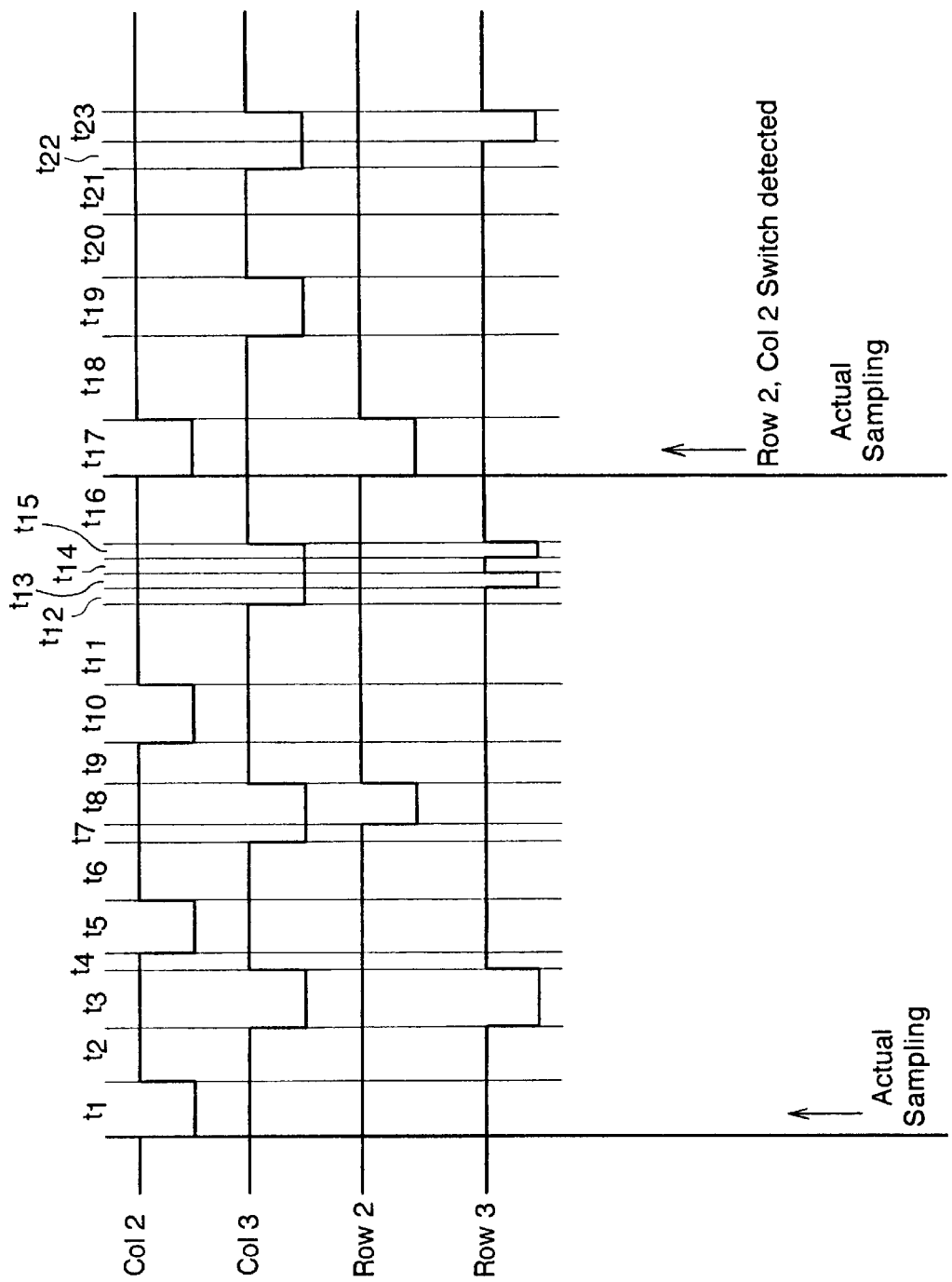
FIG. 3B is a timing chart showing the generation of actual and false polling signals and simulated data entry generated by the secured processor in a secured mode in accordance with the present invention.

Referring now to FIG. 3B, a timing chart showing the generation of pulse signals by the actual and false polling circuits in accordance with the present invention is shown. FIG. 3B shows 23 time frames ($t_1$–$t_{23}$) of varying duration and occurrence. Actual sampling is conducted by the actual polling circuit 14 during time frames $t_1$ and $t_{17}$. False samples and simulated data entry occur during all other time frames. As is evident from FIG. 3B, without knowing when sampling is being conducted by the actual polling circuit, an electronic eavesdropper is not likely to determine during which time period(s) PIN data is being entered. For example, during time periods $t_3$, $t_8$, $t_{13}$, $t_{15}$, $t_{17}$, and $t_{23}$, various row and column combinations are shown as having coincident signals. However, only during time $t_{17}$, during which time actual sampling is being conducted by the actual polling circuit is a key of the keypad detected as being depressed by a user. As is evident from FIG. 3B, an electronic eavesdropper cannot readily discern which signals are actual samples and which samples are false samples. FIG. 3B clearly shows the benefit of the present invention and its ability to mask actual samples and simulate key depressions with a plurality of false samples and simulated data entries.

In order to substantially prevent unauthorized access to the unencrypted PIN and account information, the configuration of the present invention includes substantially less hardware than other designs which require a substantial physical barrier (i.e., a device which does not permit physical access to electronic circuits, and their I/O lines). As previously described, the present invention accomplishes this by encrypting the PIN data within the secured processor. Physical barriers to prevent access to PIN data do not yield the level of security that masking, simulation and encryption within the secured processor is able to provide. The present invention includes additional features to prevent the unauthorized access to a user's PIN and account information. Referring again to FIG. 1 of the drawings, the data entry keypad system 1 which includes at least the secured processor 2 within transaction terminal 4, also includes an anti-tampering switch 24 operably coupled between a power supply $V_{BATT}$ and each of the circuits contained within the secured processor 2. The anti-tampering switch 24 is designed to detect and defeat the physical tampering of the secured processor. In a preferred embodiment, the anti-tampering switch is a normally open switch which is forced closed when shutting a cover of a case (not shown) in which the secured processor 2 is contained. As a result, if the case is opened by an unauthorized person, the switch 24 will change from a closed to an open state, thereby interrupting the connection to the power supply and breaking the supply of power to the secured processor. Since each circuit of the secured processor requires power to maintain its memory (i.e., execution programs stored in ROM, data stored in RAM, etc.) the severance of the power supply will cause the erasure of all of the contents of the processor. This includes encryption code stored in the data encoding circuit 22 and the sampling operations performed by the actual and false polling circuits 14, 16. Therefore, opening the case and removing the secured processor will render the secured processor unusable. Any circuit analysis of the secured processor by an unauthorized person will not compromise the method.

Figure 4:
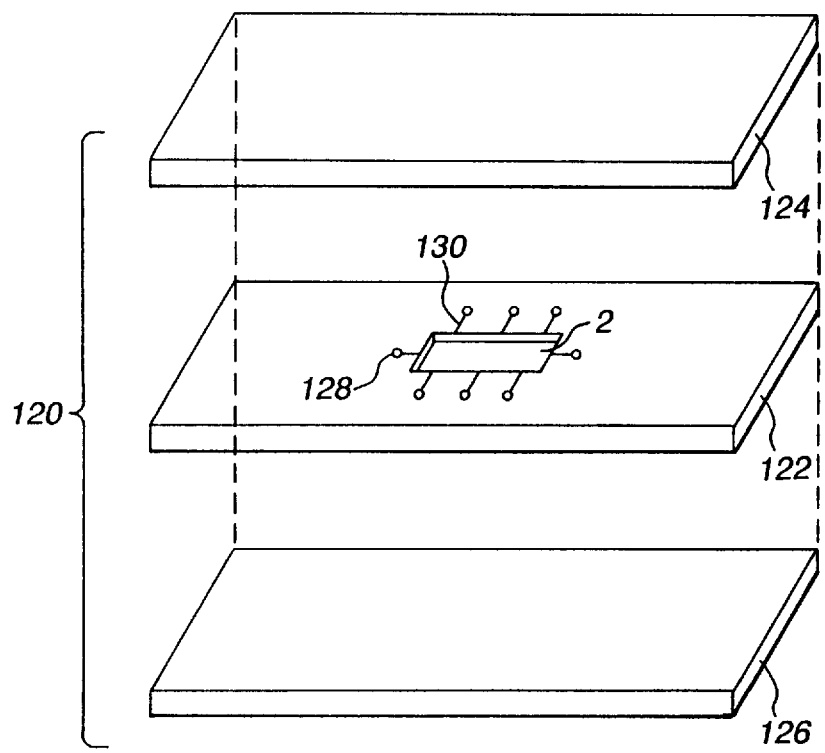
FIG. 4 is a partially exploded perspective view of the secured processor encapsulated within a multi-layer circuit board in accordance with the present invention.

As a further security measure, the secured processor 2 is preferably attached and encapsulated in a multilayer circuit board 120 as shown in FIG. 4. More specifically, the secured processor is contained on circuit board substrate 122 and is encapsulated by circuit board substrates 124 and 126. In the preferred embodiment, all of the circuitry of the keypad and the secured processor, with the exception of the keypad itself, is contained on circuit board substrate 122 (i.e., an interior layer of multilayer circuit board 120). In addition, electrical connections between circuit board substrates 124 and 126 and the secured processor 2, for connection to various interface circuits such as ASIC's and microprocessors, preferably utilize blind vias 128 which hide connections 130 within the interior of the multilayer circuit board. As a result of the positioning of the secured processor 2 within multilayer circuit board 120, any attempt to physically access the secured processor 2 would necessarily result in destruction of the circuit board substrates 124, 126 and inoperability of the secured processor.

In an alternative embodiment of the invention and as a further security measure, steps 112, 114 and 116 are modified as follows. When the processor determines that all of the PIN data has been received and identified by the actual polling circuit 14, the PIN data is preferably not immediately provided to the processor 6. Instead, rather than executing Step 112, a random time delay may be executed wherein sampling of the keypad continues while data encryption occurs with Step 114. Then, 116 is executed not only when encryption is complete but when the random time delay expires. In this way, an electronic eavesdropper will be unable to identify the actual polling circuit signals based on a consistent relationship between the time that the actual polling circuit ceases operation and the time that encrypted data is provided to processor 6.

As a result of the present invention, the PIN data provided to a transaction terminal by a user is protected from electronic eavesdropping by encrypting the PIN data before the data is provided on external data lines to the processor. The keypad processor security apparatus utilizes both actual and false polling of the keypad, in addition to the generation of false keypad actuation to prevent an electronic eavesdropper from fraudulently accessing PIN data.

Although illustrative embodiments of the present invention have been described herein with reference to the accompanying drawings, it is understood that the invention is not limited to those precise embodiments, and that various other changes and modifications may be effected therein by one skilled in the art without departing from the scope or spirit of the invention. For example, one timer can be utilized in the control circuit 12 as opposed to timers 18a and 18b. Also, the operation of the system need not begin with actuation of the actual polling circuit, but instead, the false polling circuit could be activated first. These and all such other modifications are intended to fall within the scope of the present invention as defined by the following claims.

I claim:

1. A secured processor for use with a plurality of data entry ports which receive data signals, the secured processor comprising:

an actual polling circuit adapted to be operatively coupled to the plurality of data entry ports for conducting actual polling, the actual polling circuit providing an actual polling signal for monitoring each of the plurality of data entry ports to determine whether data signals are being received, the actual polling circuit identifying the data entry ports receiving data signals and generating an output signal corresponding thereto;

a false polling circuit adapted to be operatively coupled to the plurality of data entry ports, the false polling circuit providing a false polling signal to the plurality of data entry ports for: (i) producing a false indication that a data signal is being received by at least one of the plurality of data entry ports and (ii) producing a false indication that actual polling of the plurality of data entry ports is occurring, the false polling circuit also providing a signal indicating which of the plurality of data entry ports is to be provided with said false polling signal; and a data encoding circuit adapted to be operatively coupled to the actual polling circuit, the data encoding circuit being responsive to a signal related to the actual polling circuit output signal, the data encoding circuit encoding a signal related to the data signals and generating an encoded signal for transmission external to the secured processor.

2. The secured processor as defined by claim 1 wherein the plurality of data entry ports corresponds to a keypad having a plurality of keys, and wherein the false indication that data is being received by at least one of the plurality of data entry ports corresponds to a simulation that at least one of the plurality of keys of the keypad is being activated.

3. The secured processor as defined by claim 1 wherein the false indication that actual polling of the plurality of data entry ports is occurring corresponds to a masking of the actual polling signal provided by the actual polling circuit.

4. The secured processor as defined by claim 1 wherein the secured processor comprises a microprocessor.

5. The secured processor as defined by claim 1 wherein the actual polling circuit, false polling circuit and data encoding circuit are contained within a single electronic chip.

6. The secured processor as defined by claim 5 wherein the single electronic chip is encapsulated within a multilayer circuit board.

7. The secured processor as defined by claim 1 further comprising:
a control circuit operatively coupled to the actual polling circuit and the false polling circuit, the control circuit instructing at least one of the actual polling circuit and the false polling circuit to poll the plurality of data entry ports.

8. A secured processor as defined by claim 7 wherein the control circuit includes a timer circuit, the timer circuit providing an indication to the control circuit for instructing at least one of the actual polling circuit and false polling circuit to poll the plurality of data entry ports.

9. The secured processor as defined by claim 1 further comprising:
a memory circuit operatively coupled to the actual polling circuit and the data encoding device, the memory circuit being responsive to and storing at least one signal related to the actual polling circuit output signal.

10. The secured processor as defined by claim 1 further comprising:
a power-up switch operatively coupled to a power supply and to at least one of the actual polling circuit, false polling circuit and data encoding device, the power-up switch being responsive to a physical tampering of the secured processor and at least temporarily interrupting the operative coupling of the power supply to at least one of the actual polling circuit, false polling circuit and data encoding device.

11. The secured processor as defined by claim 1 wherein the actual polling circuit includes a signal generator for providing an actual polling signal to the plurality of data entry ports; and
wherein the false polling circuit includes a signal generator for providing a false polling signal to the plurality of data entry ports.

12. The secured processor as defined by claim 11, wherein respective signal generators which provide at least one of the actual polling signal and the false polling signal generate these polling signals as pulsed signals.

13. The secured processor as defined by claim 12 wherein respective signal generators control the pulsed signals to vary in width.

14. The secured processor as defined by claim 12, wherein the actual polling circuit signal generator controls the actual polling signal such that time between each of the plurality of pulsed actual polling signals varies.

15. The secured processor as defined by claim 12, wherein the false polling circuit signal generator controls the false polling signal such that time between each of the plurality of pulsed false polling signals varies.

16. The secured processor as defined by claim 1 wherein the false polling circuit further comprises:
a second memory circuit for storing said signal indicating which of the plurality of data entry ports is to be provided with the false polling signal.

17. A secured processor for use with a plurality of data entry ports which receive data signals, the secured processor comprising:
an actual polling circuit adapted to be operatively coupled to the plurality of data entry ports for conducting actual polling, the actual polling circuit providing a plurality of actual polling signals for monitoring each of the plurality of data entry ports to determine whether data signals are being received, the actual polling circuit identifying the data entry ports receiving data signals and generating an output signal corresponding thereto; and
a false polling circuit adapted to be operatively coupled to the plurality of data entry ports, the false polling circuit providing a plurality of false polling signals to the plurality of data entry ports for : (i) producing a simulation that a data signal is being received by at least one of the plurality of data entry ports and (ii) masking the actual polling signal being provided to the plurality of data entry ports, and the false polling circuit also providing a signal indicating which of the plurality of data entry ports is to be provided with said false polling signals.

18. A secured processor as defined by claim 17 wherein the actual polling circuit includes a signal generator circuit for generating the actual polling signals and the false polling circuit includes a signal generator circuit for generating the false polling signals, and wherein at least one of the actual polling signal and the false polling signal has a controlled duration.

19. A secured processor as defined by claim 18 wherein the actual polling circuit signal generator varies a time elapsed between each of the plurality of actual polling signals.

20. A secured processor as defined by claim 18, wherein the false polling circuit signal generator varies a time elapsed between each of the plurality of false polling signals.

21. A secured processor as defined by claim 18 wherein the actual polling circuit signal generator controls the width of each of the plurality of actual polling signals.

22. A secured processor as defined by claim 18, wherein the false polling circuit signal generator controls the width of each of the plurality of false polling signals.

23. A method of providing a secured transmission of actual data signals received by a keypad of a transaction terminal to a processor which is external to the transaction terminal, the method comprising the steps of:
a) polling the keypad to determine whether actual data signals are being provided thereto;
b) polling the keypad with false polling signals to provide a false indication that (i) actual data signals are being provided thereto and (ii) actual polling of the transaction terminal is occurring, and indicating where said false polling signals are being provided to the keypad; and
c) encoding the actual data signals and transmitting the encoded data signals to the external processor.

24. The method of providing a secured transmission as defined by claim 23, wherein the polling of the keypad in step (a) is performed randomly.

25. The method of providing a secured transmission as defined by claim 23, wherein the polling of the keypad in step (b) is performed randomly.

26. The method of providing a secured transmission as defined by claim 23, the method further comprising the step of:
performing a random time delay prior to transmitting the encoded data signals to the processor.

27. A data entry system comprising:
a keypad having a plurality of key switches, each of the plurality of key switches selectively electrically coupling at least one of a plurality of row conductors and at least one of a plurality of column conductors; and
a secured processor circuit adapted to be operatively coupled to each of the plurality of row and column conductors of the keypad, the secured processor including:
(i) an actual polling circuit adapted to be operatively coupled to each of the plurality of row and column conductors for conducting actual polling, the actual polling circuit providing an actual polling signal on at least one of the plurality of row and column conductors for detecting actuation of a key switch, the actual polling circuit providing an actual polling circuit output signal indicative of which particular key switch from among said plurality of key switches has been actuated;
(ii) a false polling circuit adapted to be operatively coupled to each of the plurality of row and column conductors, the false polling circuit providing a false polling signal on at least one of the plurality of row and column conductors for providing: (i) simulation that a particular one of said plurality of key switches has been activated and (ii) masking the actual polling of the data entry ports by the actual polling circuit, and the false polling circuit also providing a signal indicating which of the plurality of row and column conductors is to be provided with said false polling signal; and
(iii) a data encoding circuit adapted to be operatively coupled to the actual polling circuit and being responsive to a signal related to the actual polling circuit output signal, the data encoding circuit encoding a signal related to the actual polling circuit output signal and generating an encoded signal for transmission external to the data entry keypad system.

28. A data entry system as defined by claim 27 wherein the actual polling signal and the false polling signal are pulsed signals.

29. A data entry system as defined by claim 28 further comprising a signal generator wherein the signal generator controls an elapsed time between each of the actual polling signals.

30. A data entry system as defined by claim 28 further comprising a signal generator wherein the signal generator controls an elapsed time between each of the false polling signals varies.

31. A data entry system as defined by claim 27 further comprising:
an auxiliary processor operatively coupled to the secured processor for receiving the encoded signal and transmitting the encoded signal external to the data entry keypad system.

32. A data entry system as defined by claim 27 further comprising:
a card reader circuit operatively coupled to the secured processor, the card reader circuit providing an indication to the secured processor of activation of the data entry keypad system by a user.

33. A data entry system as defined by claim 32 further comprising:
an interface circuit operatively coupled between the secured processor and the card reader circuit, the interface circuit providing an interface for operable communication between the card reader circuit and the secured processor.

34. A secured processor for use with a plurality of data entry ports which receive data signals, the secured processor comprising:
actual polling means operatively coupled to the plurality of data entry ports for conducting actual polling, the actual polling means providing an actual polling means signal for monitoring each of the plurality of data entry ports to determine whether data signals are being received, the actual polling means identifying the data entry ports receiving data signals and generating an output signal corresponding thereto;
false polling means operatively coupled to the plurality of data entry ports for providing a false polling means signal to the plurality of data entry ports for (i) producing a false indication that a data signal is being received by at least one of the plurality of data entry ports and (ii) producing a false indication that actual polling of the plurality of data entry ports is occurring, and the false polling means also providing a signal indicating which of the plurality of data entry ports is to be provided with said false polling means signal; and
data encoding means operatively coupled to the actual polling means for responding to a signal related to the actual polling means output signal, the data encoding means encoding a signal related to the data signal and generating an encoded signal for transmission external to the secured processor.

* * * * *

UNITED STATES PATENT AND TRADEMARK OFFICE
CERTIFICATE OF CORRECTION

PATENT NO. : 5,832,206
DATED : November 3, 1998
INVENTOR(S) : Armando De Jesus et al.

It is certified that error appears in the above-identified patent and that said Letters Patent is hereby corrected as shown below:

Title page, Item [56] References Cited, under "U.S. PATENT DOCUMENTS" change "5,197,840" to --5,196,840--

Signed and Sealed this

Eleventh Day of April, 2000

*Attest:*

Q. TODD DICKINSON

*Attesting Officer*  *Director of Patents and Trademarks*